US 010572314B2

(12) United States Patent
Ortega et al.

(10) Patent No.: US 10,572,314 B2
(45) Date of Patent: Feb. 25, 2020

(54) METHODS AND APPARATUS TO DISTRIBUTE A WORKLOAD FOR EXECUTION

(71) Applicant: Intel Corporation, Santa Clara, CA (US)

(72) Inventors: Gonzalo Ortega, Hillsboro, OR (US); Ben Nagar, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 108 days.

(21) Appl. No.: 15/868,377

(22) Filed: Jan. 11, 2018

(65) Prior Publication Data

US 2019/0042328 A1 Feb. 7, 2019

(51) Int. Cl.
*G06F 9/50* (2006.01)
*G06F 1/16* (2006.01)
*G06F 11/30* (2006.01)
*G06F 11/34* (2006.01)

(52) U.S. Cl.
CPC ............ *G06F 9/5083* (2013.01); *G06F 1/163* (2013.01); *G06F 11/3006* (2013.01); *G06F 11/3414* (2013.01)

(58) Field of Classification Search
CPC .................................................. G06F 9/5083
See application file for complete search history.

(56) References Cited

U.S. PATENT DOCUMENTS

| 9,531,837 | B2 | 12/2016 | Brown | |
|---|---|---|---|---|
| 2010/0162254 | A1* | 6/2010 | Simpson | G06F 11/0715 718/102 |
| 2012/0131593 | A1* | 5/2012 | DePetro | G06F 9/5088 718/105 |
| 2013/0202121 | A1* | 8/2013 | Georgiou | H03G 9/005 381/56 |
| 2015/0346799 | A1 | 12/2015 | Sengupta et al. | |
| 2016/0119443 | A1* | 4/2016 | Susarla | H04L 67/2842 709/213 |

FOREIGN PATENT DOCUMENTS

WO 2016087476 6/2016

OTHER PUBLICATIONS

Apple (FAQ: Everything you need to know about the Apple Watch, Macworld, 2016 (Year: 2016).*
Beck-Norén, "Thesis: Cross-platform Development for Wearable Devices", published by Linköping Unicersity, Department of Computer and Information Science, on Jun. 10, 2015, 95 pages.

* cited by examiner

*Primary Examiner* — Charlie Sun
(74) *Attorney, Agent, or Firm* — Hanley Flight & Zimmerman, LLC

(57) ABSTRACT

Methods, apparatus, systems and articles of manufacture to distribute a workload for execution are disclosed. An example apparatus includes a workload container interface to access a workload for execution at a remote device, the workload including workload instructions and a specified capability to be met by the remote device. A runtime selector is to select the remote device for execution of the workload based on the specified capability being present in a list of capabilities discovered for the remote device. A workload transmitter to transmit, in response to the selection of the remote device for execution of the workload, the workload to the remote device for execution.

15 Claims, 12 Drawing Sheets

METHODS AND APPARATUS TO DISTRIBUTE A WORKLOAD FOR EXECUTION

FIELD OF THE DISCLOSURE

This disclosure relates generally to distributed workload execution and access to remote computing resources, and, more particularly, to methods and apparatus to distribute a workload for execution.

BACKGROUND

In recent years, wearable computing devices have been introduced that allow for new functionalities. Such wearable devices typically include a limited set of sensors that, while appropriate for the intended purpose of the device, leave out a wide range of other possible sensors and/or actuators. In some cases, certain capabilities, features, sensors, etc., are not appropriate, not recommended, and/or are unsuitable for the form factor or the place where the wearable device is intended to be worn.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
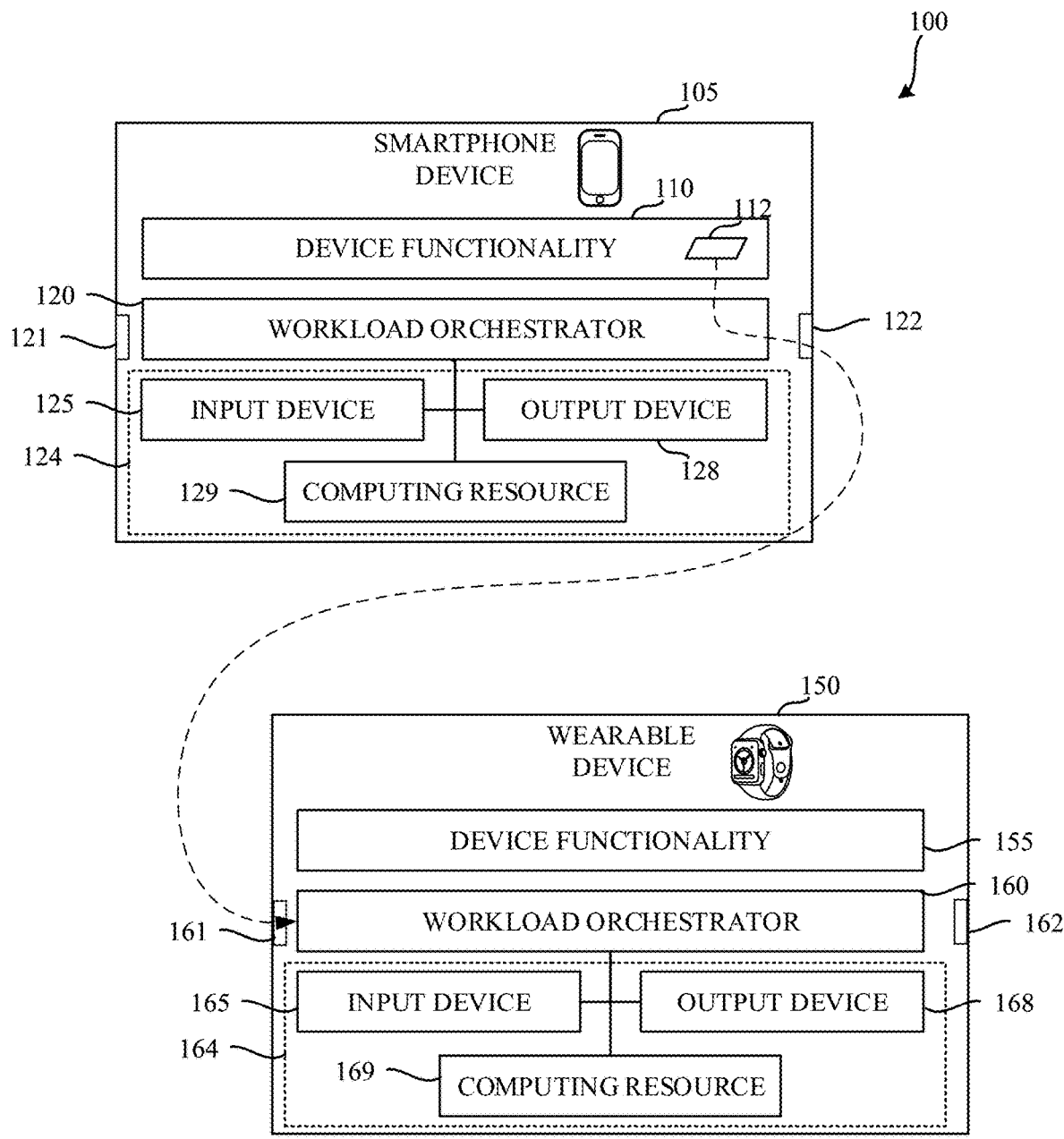
FIG. 1 is an illustration of an example environment of use including an example smart phone device and an example wearable device implemented in accordance with the teachings of this disclosure.

To keep costs down, maintain a small physical form factor, and/or reduce power consumption, wearable devices are designed with limited computing capabilities (e.g., limited processing power, limited memory, limited connectivity, etc.). Likewise, the wearable device is built with a limited set of sensors typically intended only for the purpose of the device (e.g., a wearable smartwatch may include a heartrate sensor, but not include a speaker). Such wearable device implementations leave out a wide range of other possible resources, such as sensors (e.g., buttons, microphones, accelerometers, gyroscopes, positioning sensors, heart rate monitors, light sensors, pressure sensors, temperature sensors, etc.), actuators (e.g., haptics engine, LEDs, displays, speakers, etc.), and/or computing resources (e.g., compute resources, memory resources, etc.). In some examples, certain capabilities, features, sensors, etc., are not appropriate, not recommended, and/or are unsuitable for the form factor or the place where the device is intended to be worn. For example, a vibration motor may not be an acceptable device to include in smart glasses.

In some examples, a missing resource not available in a given wearable device is available in another wearable device worn by the user, or in the user's smart phone. In some examples, the resource may be available in a remote computing system such as, for example, a server (e.g., the cloud). For example, if a user's smart glasses lack a vibration engine, there may be such a vibration engine in the user's smart phone or in the user's smart watch that could be utilized to provide vibrational feedback to the user.

Existing approaches to enable such functionality between devices require a primary application and/or a companion application to be installed in both devices. For example, a primary application may need to be installed in the device that lacks the resource, and a companion application may need to be installed in the device that has the resource. In that way, the primary application can communicate with the companion application to utilize the missing resource, when needed. Such an approach is inconvenient for a number of reasons. For example, a developer needs to expand resources to design and implement (at least) two independent applications, a first application (e.g., the primary application) intended to be executed in one wearable device, and a second application (e.g., a companion application) that is different from the first application and is intended to be executed in a different device (e.g., another wearable device, a smart phone, etc.). Moreover, such companion applications typically need to have multiple different implementations, depending on the platform where the companion application is intended to be executed (e.g., an Android smartwatch, an Apple Watch, an Android Smartphone, an Apple iPhone, etc.).

Such an approach is inconvenient for developers (who must develop multiple versions of the primary application and/or companion application for use in different computing devices) as well as inconvenient for users (who must install the primary application and/or companion application in their computing devices). Moreover, the user might have multiple smart phones, multiple smart watches, multiple pairs of smart glasses, multiple pairs of smart shoes, etc.

Example approaches disclosed herein enable access to remote resources across heterogeneous devices. Example approaches disclosed herein enable instruction offloading that allows movement of instructions to be executed across a dynamic network of wearable devices, effectively allowing execution of parts of an application to be distributed across devices.

Moving instructions to a remote device for execution (e.g., for local execution at the remote device) enables additional functionalities to be utilized (e.g., a vibration alert can be initiated by a device that lacks vibration output), while also enabling such functionality to be developed in the same way as if the resource had been locally available to the original device. In some examples, more resource-intensive tasks (e.g., complex computations) may be moved to a remote device for execution, thereby reducing an impact on the local device (e.g., a smart watch with limited computing capabilities).

In example approaches disclosed herein, components of an application (workloads) are identified and described by a developer during application design. The workload definition includes instructions to be executed, as well as information concerning resources and/or capabilities needed for the workload to be executed (e.g., instructions that such workload must be executed at a device that has a speaker). Prior to execution, such workloads are sent to one or more remote devices appropriate for the given workload by a workload orchestrator. In examples disclosed herein, the remote device also implements a workload orchestrator, which enables the remote device to host and/or execute workloads.

In examples disclosed herein, a workload orchestrator that is implemented at a device providing a workload is referred to as a source workload orchestrator, and a workload orchestrator that is implemented at a device executing the instructions of the workload is referred to as a target workload orchestrator. A target workload orchestrator may be implemented remotely (e.g., in a different device from the source workload orchestrator) or locally (e.g., implemented in a same device as the source workload orchestrator). When implemented locally, the source workload orchestrator and the target workload orchestrator may be implemented by a same workload orchestrator (e.g., by the same program). Such workload orchestrator(s) can be implemented in a software development kit (SDK), a companion application, and/or even directly be part of the underlying wearable platform (e.g., an operating system component).

In examples disclosed herein, the workload orchestrator enables identification of capabilities defined according to the device characteristics, software, and/or APIs supported and/or available at the device. When a new target workload orchestrator becomes available (e.g., when a connection is established with another wearable device), the workload orchestrator(s) verify the capabilities of the other (e.g., remote) workload orchestrators to identify which workloads can be offloaded. In some examples, the local workload orchestrator sends a workload to the target workload orchestrator for immediate execution and/or for later execution.

When a remote workload orchestrator becomes unavailable (e.g., when the connection between devices is interrupted for some reason) the local workload orchestrator might offload the workload to a different remote workload orchestrator, and/or locally execute the workload.

Thus, example approaches disclosed herein enable discovery of remote workload orchestrators and offloading of workloads to be executed by a remote workload orchestrator. While example approaches disclosed herein are described in the context of wearable devices, such approaches can also be extended to offload workloads beyond wearable devices to, for example, Internet of Things (IoT) devices, smart phones, tablets, PCs, servers, the cloud, etc.

FIG. 1 is an illustration of an example environment of use 100 including a smart phone device 105 and a wearable device 150 implemented in accordance with the teachings of this disclosure. In the illustrated example of FIG. 1, the example smart phone device 105 includes first device functionality 110, a first workload orchestrator 120, one or more transceivers 121, 122, and resources 124. The example resources 124 include a first input device 125, a first output device 128, and a first computing resource 129. The example wearable device 150 includes second device functionality 155, a second workload orchestrator 160, one or more transceivers 161, 162, a second input device 165, a second output device 168, and a second computing resource 169. In operation, the first device functionality 110 of the example smart phone device 105 provides a workload 112 to the first workload orchestrator 120 that is to be offloaded to the second workload orchestrator 160 of the wearable device 150.

The first example device functionality 110 of the illustrated example of FIG. 1 represents an application and/or program implemented and/or executed by the example smart phone device. The example device functionality 110 interfaces with the workload orchestrator 120 to provide a workload 112 to the workload orchestrator 120 for execution. As described in further detail below in connection with FIG. 4, the workload 112 represents instructions to be executed and rules for where such instructions may be executed.

The first example workload orchestrator 120 of the illustrated example of FIG. 1 enables the smart phone device 105 to host and/or execute a workload, as well as provide a workload to a remote workload orchestrator (e.g., a workload orchestrator implemented at a different device). The workload orchestrator 120 can be implemented as hardware (e.g., a logic circuit), in a software development kit (SDK), a companion application, and/or even directly as part of the underlying device and/or platform (e.g., an operating system component). An example implementation of a workload orchestrator is described below in connection with FIG. 2.

The first example transceiver(s) 121, 122 enable the workload orchestrator 120 to communicate with a workload orchestrator implemented at another device (e.g., a remote workload orchestrator). In examples disclosed herein, the first example transceiver(s) 121, 122 are implemented using a short range wireless communication technology such as, for example, Bluetooth. However, any other past, present, and/or future communication technologies may additionally or alternatively be used such as, for example, Ethernet communications, cellular communications, wired communications (e.g., via a Universal Serial Bus (USB) connection), etc. While in the illustrated example of FIG. 1, the first example transceiver(s) 121, 122 are shown as two transceivers, the first example transceiver(s) may be implemented as a single transceiver or any other number of transceiver(s).

The example resources 124 include the first input device 125, the first output device 128, and the first computing resource 129. In some examples, other resources may be used such as, graphical processing resources, memory resources, network connectivity resources (e.g., a wireless Internet connection), etc.

The first example input device 125 of the illustrated example of FIG. 1 enables the example smart phone device 105 to receive an input (e.g., a user input). In some examples, the input device 125 may be implemented using multiple different types of input device(s). The first example input device(s) 125 can be implemented by, for example, a sensor, an audio sensor, a microphone, a camera (still or video), a keyboard, a button, a mouse, a touchscreen, a track-pad, a trackball, isopoint, and/or a voice recognition system, etc.

The first example output device 128 of the illustrated example of FIG. 1 enables the example smart phone device 105 to produce an output. The first example output device 128 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device (e.g., a vibrational engine), a printer, speaker(s), etc. In some examples, the first output device 128 includes a graphics driver card, a graphics driver chip and/or a graphics driver processor.

Figure 1A:
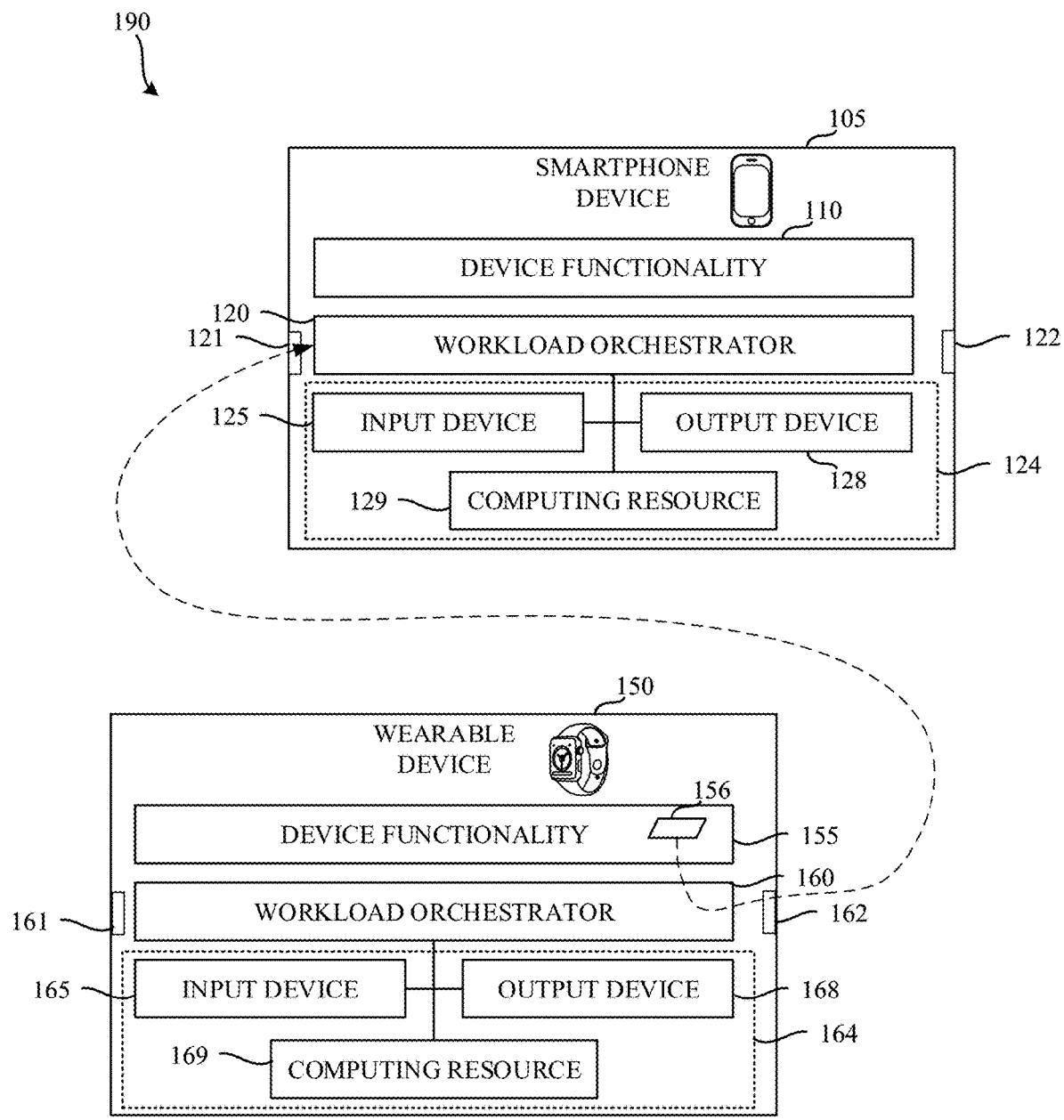
FIG. 1A is an illustration of an example environment of use including the example smart phone device and the example wearable device implemented in accordance with the teachings of this disclosure.

The first example computing resource 129 represents any computing resource of the smart phone device 105 such as, for example, a hardware processor, a memory, a graphical processing unit, etc. As different types of devices may include different amounts of computing resources (e.g., a server computer may implement a relatively large amount of computing resources, while a smart watch may implement a relatively small amount of computing resources), complex computations may not be able to be performed at devices with limited resources in a timely manner. Thus, in some examples, a workload may be provided to a remote device to enable execution of the workload at a device that has enough computing resources to perform the workload. FIG. 1A, described below, illustrates such a scenario (e.g., where the wearable device 150 offloads instructions to the smart phone device 105 for execution).

The second example device functionality 155 of the illustrated example of FIG. 1 represents an application and/or program implemented and/or executed by the example wearable device 150. The second example device functionality 155 interfaces with the second workload orchestrator 160 to provide a workload to the second workload orchestrator 160 for execution.

The second example workload orchestrator 160 of the illustrated example of FIG. 1 enables the wearable device 150 to host and/or execute a workload, as well as provide a workload to a target workload orchestrator (e.g., a workload orchestrator implemented at a different device). The second workload orchestrator 160 can be implemented as hardware (e.g., a logic circuit), in an SDK, a companion application, and/or even directly as part of the underlying device and/or platform (e.g., an operating system component). An example implementation of a workload orchestrator is described below in connection with FIG. 2.

The second example transceiver(s) 161, 162 enable the second workload orchestrator 160 to communicate with a workload orchestrator implemented at another device. In examples disclosed herein, the second example transceiver(s) 161, 162 are implemented using a short range wireless communication technology such as, for example, Bluetooth. However, any other past, present, and/or future communication technologies may additionally or alternatively be used such as, for example, Ethernet communications, cellular communications, wired communications (e.g., via a USB connection), etc. While in the illustrated example of FIG. 1, the second example transceiver(s) 161, 162 are shown as two transceivers, the second example transceiver(s) may be implemented as a single transceiver or any other number of transceiver(s).

The example resources 164 include the second input device 165, the second output device 168, and the second computing resource 169. In some examples, other resources may be used such as, graphical processing resources, memory resources, network connectivity resources (e.g., a wireless Internet connection), etc. As different types of devices may include different resources (e.g., a wearable device may implement few resources tailored to the intended wearable use, while a smart phone may include additional computing resources but omit a heartrate sensor), some devices may not be able to perform complex computations in a timely manner. Thus, in some examples, a workload may be provided to a remote device to enable execution of the workload at a device that has enough computing resources to perform the workload.

The second example input device 165 of the illustrated example of FIG. 1 enables the example wearable device 150 to receive an input (e.g., a user input). In some examples, the second input device 165 may be implemented using multiple different types of input device(s). The second example input device(s) 165 can be implemented by, for example, a sensor, an audio sensor, a microphone, a camera (still or video), a keyboard, a button, a mouse, a touchscreen, a track-pad, a trackball, isopoint, and/or a voice recognition system. In some examples, the second input device 165 is implemented by a type of input device that is different from the first example input device 125. For example, the second input device 165 may represent a heartrate sensor, while such functionality is not available locally at the smart phone device 105.

The second example output device 168 of the illustrated example of FIG. 1 enables the example wearable device 150 to produce an output. The second example output device 168 can be implemented, for example, by display devices (e.g., an LED, an OLED, a LCD, a CRT display, an IPS display, a touchscreen, etc.), a tactile output device (e.g., a vibrational engine), a printer, speaker(s), etc. In some examples, the second example output device 168 includes a graphics driver card, a graphics driver chip and/or a graphics driver processor. In some examples, the second output device 168 is implemented by a type of output device that is different from the first example output device 128. For example, the second output device 168 may represent a vibrational engine, while the first example output device does not.

The second example computing resource 169 represents any computing resource of the wearable device 150 such as, for example, a hardware processor, a memory, a graphical processing unit, etc.

FIG. 1A is an illustration of an example environment of use 190 including the example smart phone device 105 and the example wearable device 150 implemented in accordance with the teachings of this disclosure. In the illustrated example of FIG. 1A, the second example workload orchestrator 160 issues a workload 156 to the first example workload orchestrator 120. That is, the wearable device offloads the workload to the smartphone. Such an approach is beneficial as it allows access to resources (e.g., computing resources) of the smartphone that are otherwise not available at the wearable device. For example, if the wearable device implements a heart-rate analysis system to detect a heart condition of a user, such detection may require more computing and/or signal analysis resources than are available at the wearable device. Thus, the computations associated with such detection may be offloaded to the smart phone device 105 for processing.

Figure 2:
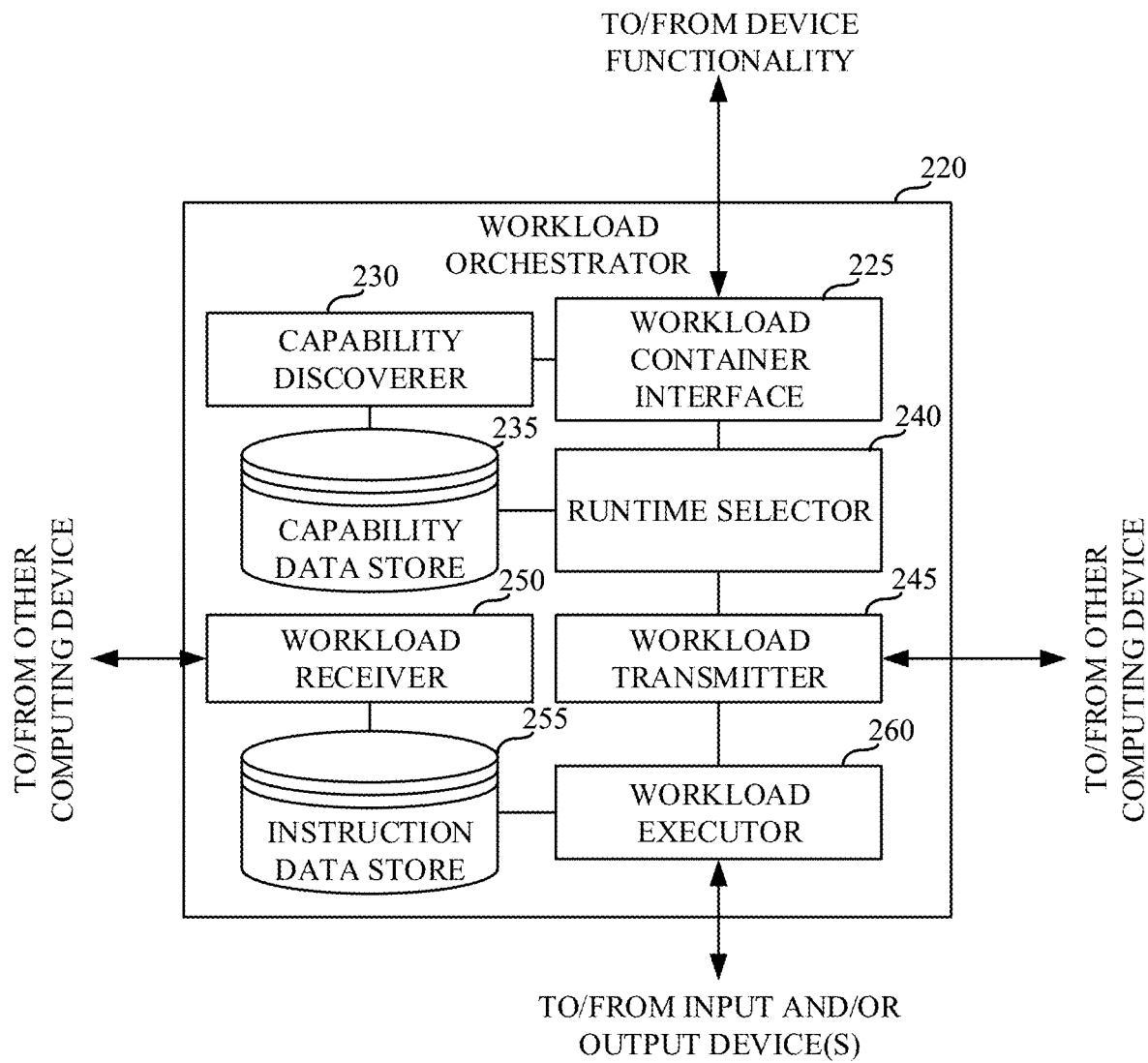
FIG. 2 is a block diagram of an example implementation of a workload orchestrator structured in accordance with the teachings of this disclosure to distribute a workload for execution.

FIG. 2 block diagram of an example implementation of a workload orchestrator 220 structured in accordance with teachings of this disclosure to distribute a workload for execution. For convenience and without loss of generality, the example workload orchestrator 220 is described from the perspective of being used for implementing the first example workload orchestrator 120 of FIG. 1. However, the example workload orchestrator 220 of the illustrated example of FIG. 2 may be used to implement the first example workload orchestrator 120 and/or the second example workload orchestrator 160 of FIG. 1. The example workload orchestrator 220 of the illustrated example of FIG. 2 includes a workload container interface 225, a capability discoverer 230, a capability data store 235, a runtime selector 240, a workload transmitter 245, a workload receiver 250, an instruction data store 255, and a workload executor 260.

The example workload container interface 225 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The example workload container interface 225 represents an object accessible by the device functionality 110. The example workload container interface 225 is instantiated by the device functionality 110, and accesses a workload provided by the device functionality 110. The workload is passed to the capability discoverer 230 for identification of a target workload orchestrator (e.g., the workload orchestrator 220 itself or a remote workload orchestrator) that is capable of executing the accessed workload.

The example capability discoverer 230 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example capability discoverer 230 communicates via the transceiver(s) 121, 122 to communicate with one or more remote workload orchestrators.

In some examples, the example capability discoverer 230 implements a passive runtime discovery approach (and/or a combination of the passive runtime discovery approach and the active runtime discovery approach). For example, the example capability discoverer 230 may listen for connections (e.g., via the transceiver(s) 121, 122) to be established between the computing device on which the workload orchestrator 220 operates and a remote device (e.g., as a result of user connecting smart glasses to a smart watch). In some examples, the capability discoverer 230 listens for such connections to be established, and requests capabilities and/or properties of those connected remote devices in response to such connection establishment.

The example capability discoverer 230 determines whether the capabilities of a remote device match those of the accessed workload. If the capability discoverer 230 determines that the capabilities of the remote device match those of the accessed workload, the example capability discoverer 230 passes the workload to the workload transmitter 245 for transmission to the remote device. In some examples, the capability discoverer 230 causes the workload transmitter 245 to transmit the workload (or portions thereof) to two or more remote devices. In some examples, the example capability discoverer 230 records an identification of the remote device in connection with the workload in the capability data store 235. Such recordation enables the workload orchestrator 220 to later identify which target workload orchestrator(s) have received the workload and/or meet the required capabilities and/or properties for execution of that workload. In some examples, the target workload orchestrator provides a workload identifier to the capability discoverer 230. The capability discoverer 230 stores the workload identifier in the capability data store 235 so that the workload at the target workload orchestrator can be referenced at a later time.

The example capability data store 235 of the illustrated example of FIG. 2 is implemented by any memory, storage device and/or storage disc for storing data such as, for example, flash memory, magnetic media, optical media, etc. Furthermore, the data stored in the capability data store 235 may be in any data format such as, for example, binary data, comma delimited data, tab delimited data, structured query language (SQL) structures, image data, etc. While, in the illustrated example, the capability data store 235 is illustrated as a single element, the capability data store 235 and/or any other data storage elements described herein may be implemented by any number and/or type(s) of memories. In the illustrated example of FIG. 2, the example capability data store 235 stores capabilities and/or properties reported by each target workload orchestrator, in connection with an identifier of the target workload orchestrator. In some examples, the example capability data store 235 stores identifiers of workloads that have been transmitted to a target workload orchestrator (e.g., that have been pre-registered with a target workload orchestrator).

The example runtime selector 240 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example runtime selector 240 selects a target workload orchestrator (e.g., a remote workload orchestrator) for execution of the workload based on the required capabilities and/or properties of the workload (e.g., the required capabilities and/or properties described below in connection with FIG. 4), and a selected runtime selection strategy of the workload (e.g., the runtime selection strategy described below in connection with FIG. 4). In examples disclosed herein, the example runtime selector 240 reviews capabilities of other devices that had been previously discovered by the example capability discoverer 230 and stored in the example capability data store 235. However, in some examples, the runtime selector 240 may cause the example capability discoverer 230 to actively request capabilities of connected devices (e.g., nearby devices).

The example runtime selector 240 determines whether the selected runtime (e.g., the selected target workload orchestrator) on which the workload is to be executed is available for workload execution. In some examples, the example runtime selector 240 selects from any known devices that have been previously connected to the workload orchestrator 220. However, in some examples, the example runtime selector 240 may select from only those devices that are presently connected. In some examples, the workload orchestrator 220 of the local device may be considered in the selection scheme (e.g., the workload may be executed locally). In examples disclosed herein, the example runtime selector 240 transmits a request message to the selected workload orchestrator to confirm the availability of the target workload orchestrator to execute the workload. However, any other approach may be used to determining whether a target workload orchestrator is available to execute a workload. In some examples, such confirmation is omitted.

The example workload transmitter 245 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example workload transmitter 245 transmits the workload (or a portion thereof) to the target device to enable execution of the workload by the target workload orchestrator. In some examples, the example workload transmitter 245 determines whether a return value is expected as a result of execution of the workload and, if so, the workload transmitter 245 waits for receipt of the result of the execution of the workload. In some examples, the workload may simply cause an operation to be performed on the target workload orchestrator that does not require a return value (e.g., displaying alert to a user). If the return value is received, the example workload transmitter 245 relays the response to the device functionality 110 via the container proxy hosted by the workload container interface 225.

The example workload receiver 250 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example workload receiver 250 receives a workload from the workload transmitter 245 of a separate workload orchestrator. That is, when the workload orchestrator 220 is implementing as a target and/or remote workload orchestrator, the example workload receiver 250 receives the workload from a separate source workload orchestrator. The example workload receiver 250 creates a workload identifier that identifies the received workload, and stores the received workload in the instruction data store 255.

Upon receipt of a workload, the example workload receiver 250 inspects the received workload to determine if the workload requests immediate execution. If the example workload receiver 250 determines that the workload is to be executed immediately, the workload executor 260 executes the instructions included with the workload stored in the instruction data store 255. If the example workload receiver 250 determines that the workload does not request immediate execution, the example workload receiver 250 returns the workload identifier to the workload orchestrator that provided the workload (i.e., the source workload orchestrator). The workload identifier allows the workload orchestrator that provided the workload to, at a later time, request execution of a workload that has been previously transmitted to the target workload orchestrator.

The example instruction data store 255 of the illustrated example of FIG. 2 is implemented by any memory, storage device and/or storage disc for storing data such as, for example, flash memory, magnetic media, optical media, etc. Furthermore, the data stored in the example instruction data store 255 may be in any data format such as, for example, binary data, comma delimited data, tab delimited data, structured query language (SQL) structures, image data, etc. While, in the illustrated example, the instruction data store 255 is illustrated as a single element, the instruction data store 255 and/or any other data storage elements described herein may be implemented by any number and/or type(s) of memories. In the illustrated example of FIG. 2, the example instruction data store 255 stores workloads for execution by the workload executor 260.

The example workload executor 260 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example workload executor 260 of FIG. 1, executes a workload by retrieving the instructions associated with the workload from the instruction data store 255, and performing the operations to be executed. In some examples, the workload executor 260 operates in connection with other execution subsystems of the example computing device on which the workload orchestrator 220 is implemented. For example, the example workload executor 260 may provide the instructions to an interpreter, a compiler, an operating system, etc., for execution of the same.

Figure 3:
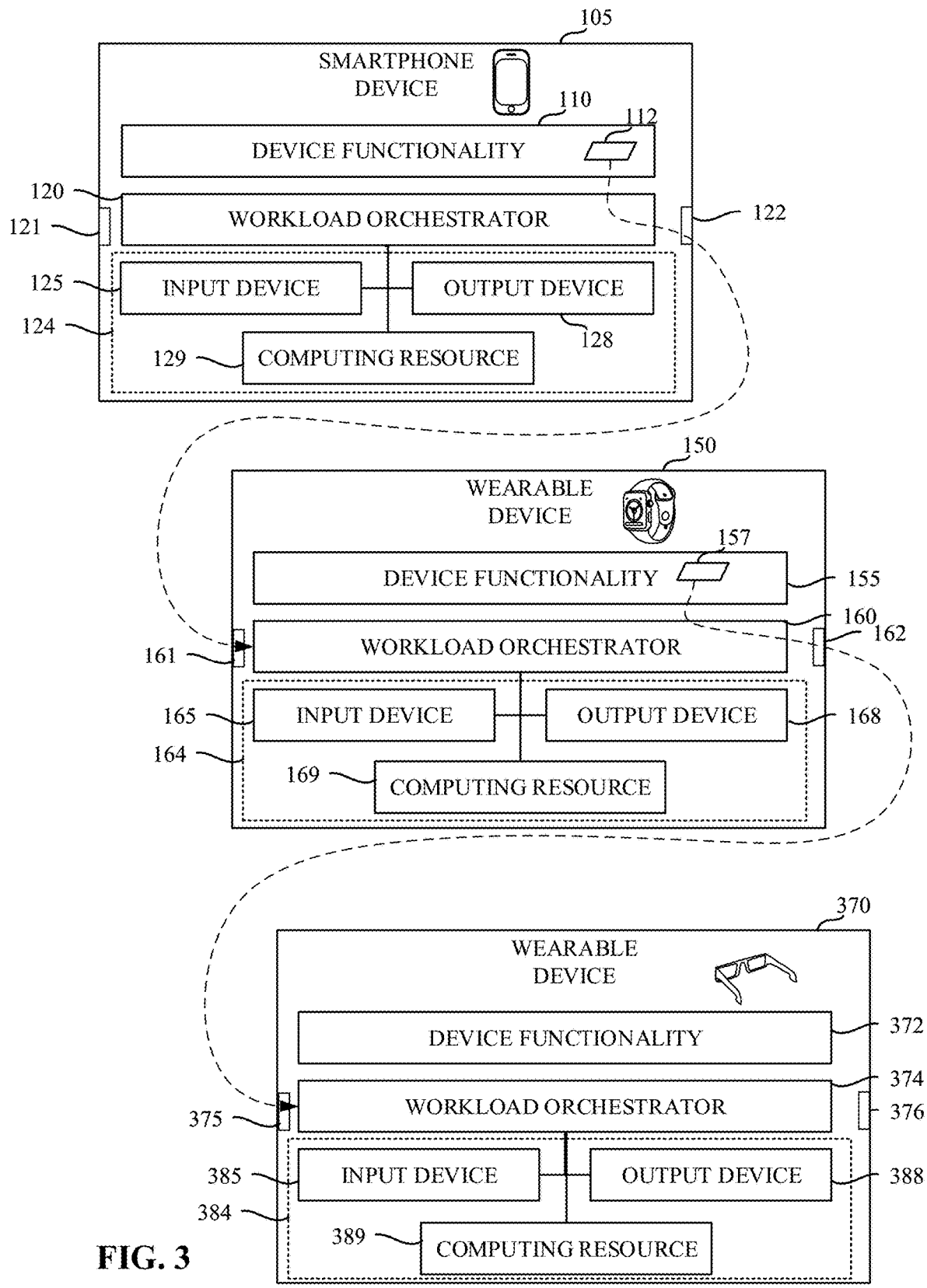
FIG. 3 is an illustration of an example environment of use including an example smart phone device and two example wearable devices implemented in accordance with the teachings of this disclosure.

FIG. 3 is an illustration of an example environment of use including the smart phone device 105, the example first wearable device 150, and a second example wearable device 370 implemented in accordance with teachings of this disclosure. In addition to the smart phone device 105 and the example device 150 described in connection with FIG. 1, the illustrated example of FIG. 3 includes the second wearable device 370. The second example wearable device 370 includes device functionality 372, a third workload orchestrator 374, third transceiver(s) 375, 376, and third resources 384. The third example resources include a third input device 385, a third output device 388, and third computing resources 389.

In the illustrated example of FIG. 3 the first wearable device 150 represents a smart watch and the second wearable device 370 represents smart glasses. In the illustrated example of FIG. 3 the first device functionality 110 provides a first workload 112 to the first wearable device 150 (e.g., the smart watch) for execution by the second workload orchestrator 160 of the first wearable device 150 (e.g., the smart watch). The first workload 112 may represent, for example, a notification for an incoming message in a messaging program that is to actuate a vibration engine of the first wearable device 150 (e.g., corresponding to the second output device 168 of the first wearable device 150) to provide a vibrational notice to a user.

In the illustrated example, the second device functionality 155 of the first wearable device 150 provides a second workload 157 to the third workload orchestrator 374 of the second wearable device 370. In this example, the second device functionality 155 may represent a heart rate monitoring application. The second example input device 165 may monitor a user's heart rate and desire to output a visual indication of the user's heart rate. Because, for example, it may be impractical for a user to be continually watching a smart watch while working out to monitor their heart rate, the heart rate may be provided to the second wearable device 370 via the second workload 157 for display to the user via the third output device 378 of the second wearable device 370 (e.g., via a head-mounted display worn by the user).

As shown in the illustrated example of FIG. 3, a workload orchestrator (e.g., the first workload orchestrator 120, the second workload orchestrator 160, the third workload orchestrator 374) may operate as a server that provides a workload to a target workload orchestrator, as well as a client that receives a workload from another workload orchestrator. For example, the second workload orchestrator 160 of the first wearable device 150 receives the first workload 112 for execution from the first workload orchestrator 120 of the smart phone device 105, as well as provides a second workload 157 to the third workload orchestrator 374 of the second wearable device 370 for execution at the second wearable device 370.

Figure 4:
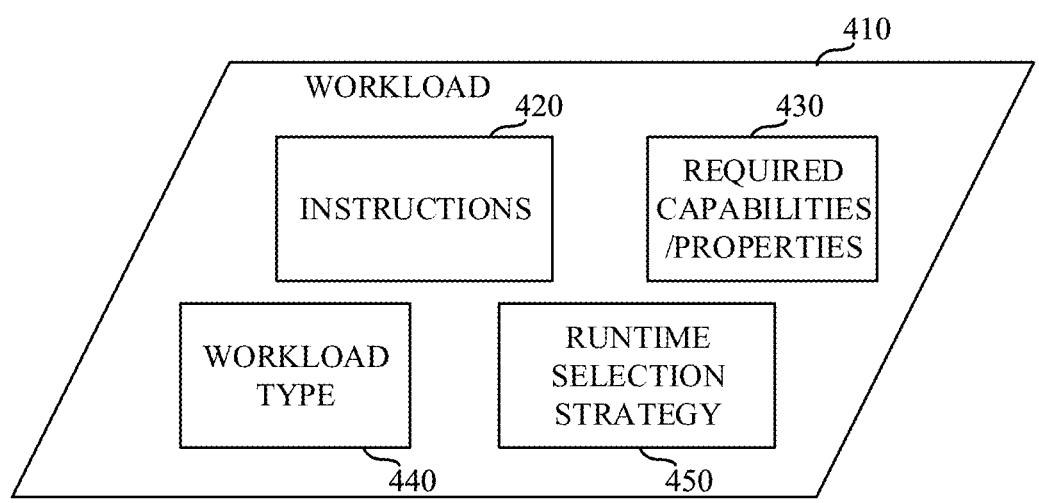
FIG. 4 is a diagram of an example representation of a workload to be executed and/or offloaded by the workload orchestrator of FIG. 2.

FIG. 4 is a diagram of an example representation of a workload 410 to be executed and/or offloaded by the workload orchestrator 220 of FIG. 2. The example workload 410 of the illustrated example of FIG. 4 includes instructions 420, required capabilities and/or properties 430, a workload type 440, and a runtime selection strategy 450.

The example instructions 420 of the illustrated example of FIG. 4 represent a module, a script, a function, and/or procedure to be executed by a workload orchestrator. In examples disclosed herein, the instructions 420 are implemented using JavaScript instructions. However, any other past, present, and/or future programming language may additionally or alternatively be used. In some examples, the instructions are formatted as text and are to be interpreted and/or compiled by the workload orchestrator 220 and/or another application (e.g., an interpreter, a compiler, etc.) operated at the device on which the instructions are to be executed. However, in some examples, the instructions may be formatted as binary instructions (e.g., pre-compiled instructions) that may be executed by an operating system of the device on which the instructions are to be executed.

The example required capabilities and/or properties 430 of the illustrated example of FIG. 4 defines capabilities and/or properties of a target workload orchestrator (e.g., a remote workload orchestrator) that must be met for the instructions 420 of the example workload 410 to be issued to the target workload orchestrator for execution. For example, the required capabilities and/or properties 430 may specify that a target workload orchestrator is required to present a visual display, provide a physical feedback to a user (e.g., activate a haptics engine), provide audio to a user (e.g., emit audio via a speaker), etc. In some examples, the required capabilities and/or properties 430 specify that the target workload orchestrator must be a remote workload orchestrator. In some examples, the required capabilities and/or properties 430 may specify particular types of inputs that must be present at the target workload orchestrator such as, for example, a touch-sensitive input, a heart rate sensor, a light sensor, etc. In some examples, additional properties concerning the computing device on which the target workload orchestrator is operated may additionally or alternatively be used such as, for example, a manufacturer of the computing device, a model of the computing device, a software version of the computing device, etc. Such an approach may enable specialized interactions to be utilized between particular devices. For example, particular functionalities may only be available when the target workload orchestrator is identified as produced by a particular manufacturer.

The example workload type 440 of the illustrated example of FIG. 4 is information concerning how the workload is to be executed. In some examples, the workload type 440 is a selection among different types of workloads that can be executed. In examples disclosed herein, the types of available workloads include a batch style workload, a remote procedure call (RPC) synchronous workload, an RPC asynchronous workload, and a message-oriented style workload. Of course, any other past, present, and/or future types of workload(s) may additionally or alternatively be utilized.

When implementing the batch style workload, the workload is offloaded to the target (e.g., remote) workload orchestrator for immediate execution. In examples disclosed herein, no return value is expected in response to execution of a batch style workload. In some examples, upon completion of execution of the batch style workload, the workload is removed from the target (e.g., remote) workload orchestrator. That is, the resources (e.g., computing resources) are freed for other workloads to utilize. Such a workload type is useful in instances where, for example, an output is to be briefly utilized (e.g., present an audible beep for one second).

When implementing the RPC synchronous style workload, the workload is offloaded to the target (e.g., remote) workload orchestrator, but execution occurs upon request. Upon completion of the workload, a result of the execution of the workload is returned to the source workload orchestrator from the target (e.g., remote) workload orchestrator.

When implementing the RPC asynchronous style workload, the workload is offloaded to the target (e.g., remote) workload orchestrator, and execution occurs upon request. A result of the execution of the workload is returned to the source workload orchestrator from the target (e.g., remote) workload orchestrator using a callback. However, any other approach to providing a result may additionally or alternatively be used.

When implementing the message-oriented style workload, the workload is offloaded to the target (e.g., remote) workload orchestrator, and execution is performed immediately. In some examples, execution of the message-oriented style workload is persistent and enables receipt of messages intermediate the target (e.g., remote) workload orchestrator and the source workload orchestrator.

The example runtime selection strategy 450 of the illustrated example of FIG. 4 is used by the source workload orchestrator to decide where a workload will be executed. In examples disclosed herein, different runtime selection strategies may be used. Example runtime selection strategies include, for example, a simple matching approach, a require/prefer/avoid approach, a rule-based matching approach, and a select/filter approach. However, any other approach for selecting a target (e.g., remote) workload orchestrator may additionally or alternatively be used.

When implementing the example simple matching approach, the example runtime selector 240 verifies that all of the specified capabilities in the workload are present at a given target (e.g., remote) workload orchestrator. When implementing the example require/prefer/avoids approach, the example runtime selector 240 evaluates whether any capabilities/properties are mandatory in a target (e.g., remote) workload orchestrator, which capabilities/properties are optional but 'preferred' (takes priority when present) in a target workload orchestrator, and finally which capabilities/properties are invalidating when present in a target workload orchestrator. When implementing the example rule based matching approach, the example runtime selector 240 evaluates logical expressions (e.g., Boolean logic expressions) to select a target (e.g., remote) workload orchestrator. When implementing the example select/filter approach, the example runtime selector utilizes a query-based selection strategy, which enables capabilities and/or properties of a target (e.g., remote) workload orchestrator to be specified and/or ordered with great detail.

Figure 5:
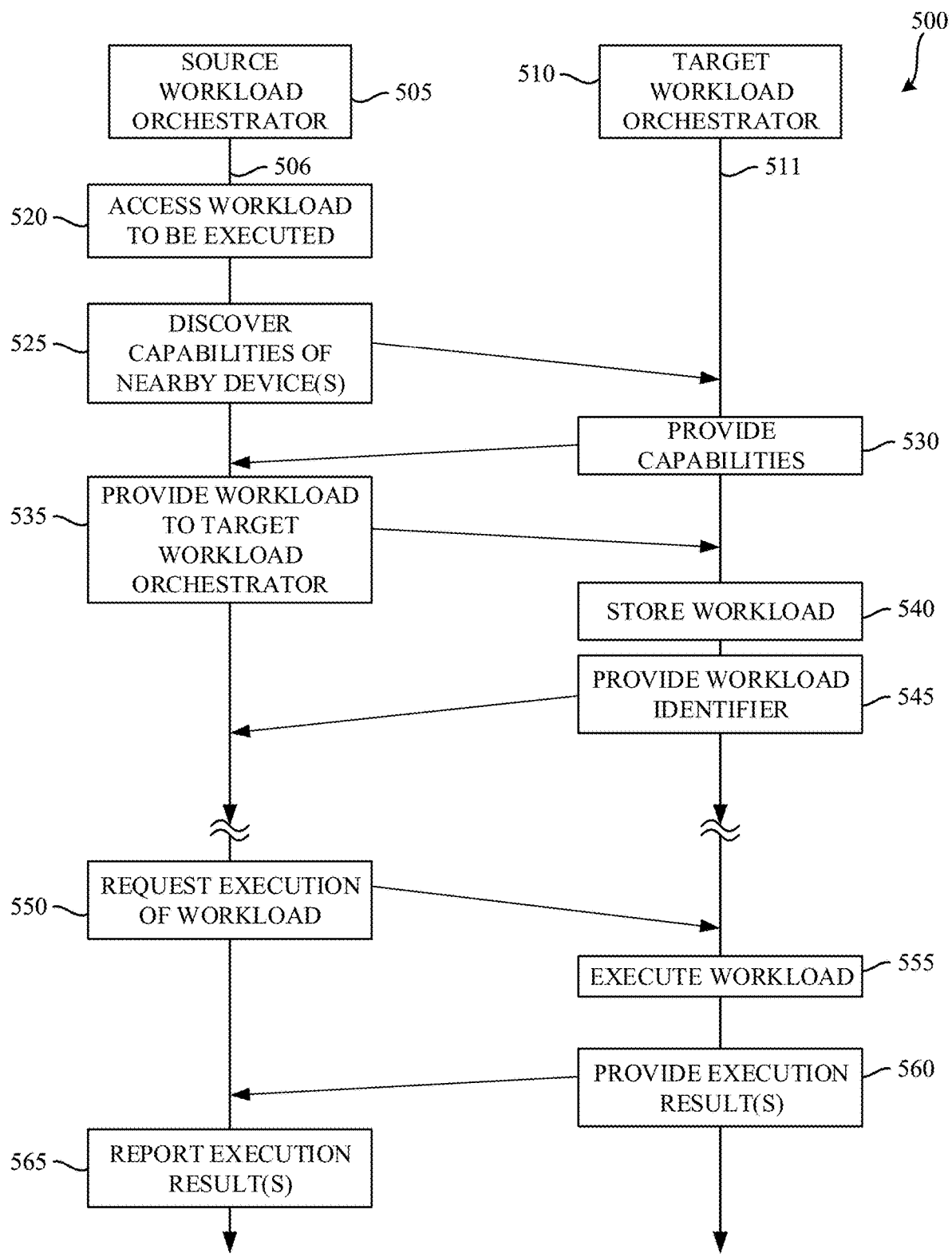
FIG. 5 is a communication diagram representing communications between an example local workload orchestrator and an example target workload orchestrator.

FIG. 5 is a communication diagram 500 representing example communications between a local workload orchestrator 505 and a target workload orchestrator 510. In the illustrated example of FIG. 5, the example local workload orchestrator 505 corresponds to the first workload orchestrator 120 of FIG. 1, and the example remote workload orchestrator 510 corresponds to the second workload orchestrator 160 of FIG. 1. The example vertical lines 506, 511 represent a progression through time.

The example communication diagram 500 begins when the example device functionality 110 of FIG. 1 provides a workload to the source workload orchestrator 505. The example source workload orchestrator 505 accesses the workload to be executed. (Block 520). The example source workload orchestrator 505 discovers capabilities of nearby devices. (Block 525). In examples disclosed herein, the source workload orchestrator 505 transmits one or more messages to the target workload orchestrator 510 (and/or other remote workload orchestrators) to request the capabilities of the target workload orchestrator 510. The example target workload orchestrator 510 provides the requested capabilities to the source workload orchestrator 505. (Block 530). In some examples, the source workload orchestrator 505 stores the identified capabilities in connection with an identifier of the target workload orchestrator to alleviate the need for future requests of the capabilities of the target workload orchestrator 505.

The example source workload orchestrator 505 determines whether the provided capabilities match the required capabilities of the accessed workload and, if so, provides the workload to the target workload orchestrator 510. (Block 535). The example target workload orchestrator 510 stores the received workload. (Block 540). The example target workload orchestrator 510 returns a workload identifier that identifies the stored workload to the source workload orchestrator 505. (Block 545). Such information is stored at the source workload orchestrator 505 so that it may be used in connection with a future request to execute the workload. In this manner, the workload can be pre-registered with the target workload orchestrator 510.

Having received the identifier of the workload as stored on the target workload orchestrator 510, the example source workload orchestrator 505 can identify which target workload orchestrator is to execute a given workload. Upon receipt of a request by the example device functionality 110 to execute the workload, the example source workload orchestrator 505 requests execution of the identified workload. (Block 550).

When requesting workload execution, the example device functionality 110 sends any input parameters to be used during execution of the workload. For example, a workload offloaded to perform the vibration might receive an amount of time (e.g., in seconds) that the vibration is to be performed and/or an intensity of the vibration. A workload offloaded that outputs a message to a screen might receive the message to be displayed (e.g., a textual representation of the message, an image representing the message, etc.)

Using the provided parameters (if any), the example target workload orchestrator 510 then executes the workload. (Block 555). In the illustrated example of FIG. 5, the example target workload orchestrator 510 provides execution results of the workload to the source workload orchestrator 505. (Block 560). The source workload orchestrator 505 then reports those execution results to the device functionality. (Block 565).

While the illustrated example of FIG. 5 represents a scenario where the source workload orchestrator 505 pre-registers a workload with a target workload orchestrator 510, in some cases such preregistration may be skipped, and workloads may be executed immediately upon receipt at the target workload orchestrator (e.g., in lieu of storing the workload and providing a workload identifier for later execution).

While an example manner of implementing the example workload orchestrator 220 is illustrated in FIG. 2, one or more of the elements, processes and/or devices illustrated in FIG. 2 may be combined, divided, rearranged, omitted, eliminated and/or implemented in any other way. Further, the example workload container interface 225, the example capability discoverer 230, the example runtime selector 240, the example workload receiver 250, the example workload transmitter 245, the example workload executor 260, and/or, more generally, the example workload orchestrator 220 of FIG. 2 may be implemented by hardware, software, firmware and/or any combination of hardware, software and/or firmware. Thus, for example, any of the example workload container interface 225, the example capability discoverer 230, the example runtime selector 240, the example workload receiver 250, the example workload transmitter 245, the example workload executor 260, and/or, more generally, the example workload orchestrator 220 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example workload container interface 225, the example capability discoverer 230, the example runtime selector 240, the example workload receiver 250, the example workload transmitter 245, the example workload executor 260, and/or, more generally, the example workload orchestrator 220 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example workload orchestrator 220 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic or machine readable instructions for implementing the example workload orchestrator 220 of FIG. 2 are shown in FIGS. 6, 7, 8, 9, and/or 10. The machine readable instructions may be a program or portion of a program for execution by a processor such as the processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowchart illustrated in FIGS. 6, 7, 8, 9, and/or 10, many other methods of implementing the example workload orchestrator 220 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 6, 7, 8, 9, and/or 10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

Figure 6:
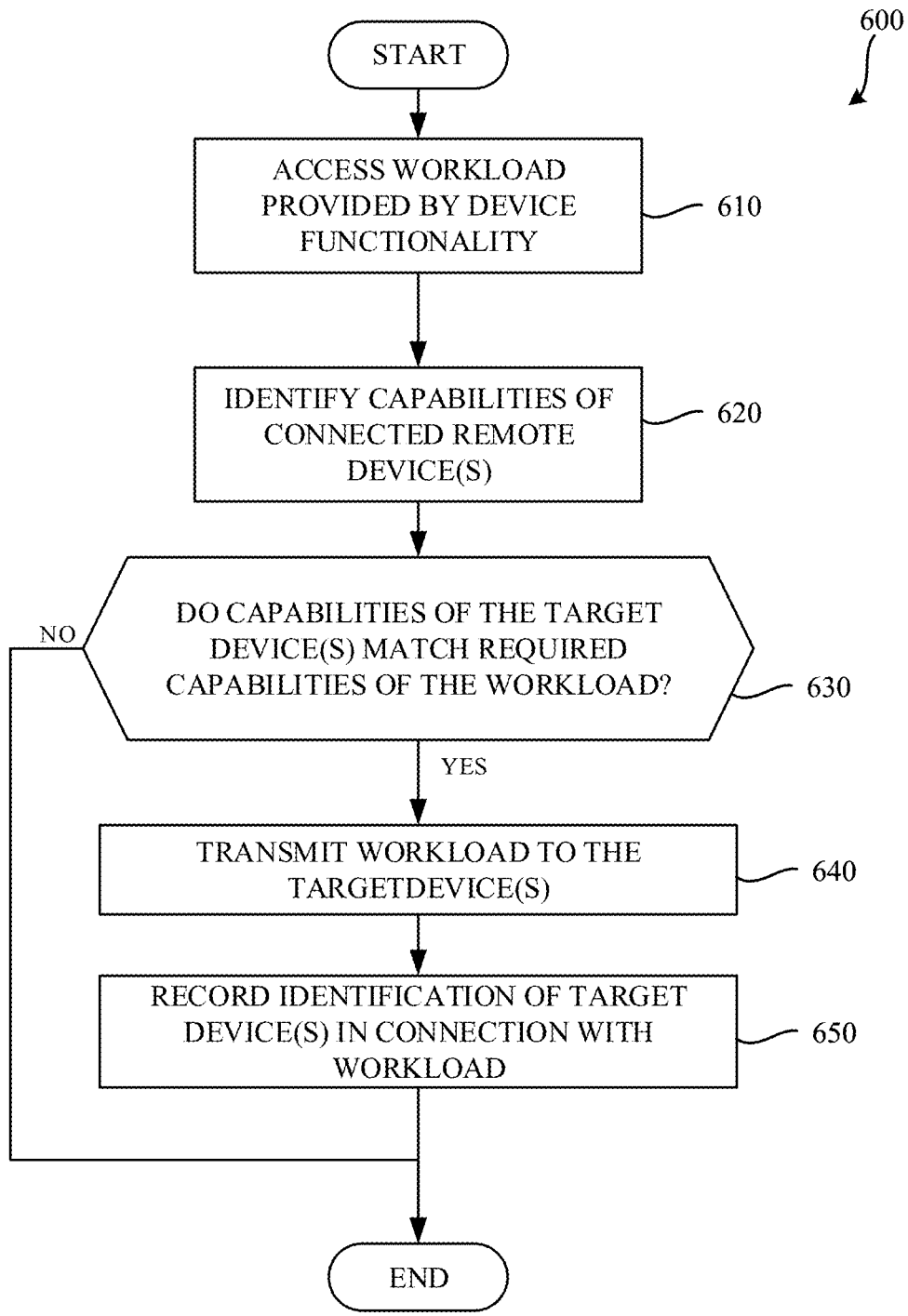
FIG. 6 is a flowchart representative of example machine readable instructions which may be executed to implement the example workload orchestrator of FIG. 1 to identify capabilities of remote devices in response to a request to offload a workload.

FIG. 6 is a flowchart representative of example machine readable instructions 600 which may be executed to implement the example workload orchestrator 220 of FIG. 2 to identify capabilities of remote devices in response a request to offload a workload. The example process of FIG. 6 represents operations that are used to pre-register a workload with a target workload orchestrator. Such an approach is useful because it enables a workload orchestrator to be aware of the nearby devices and reduce delays associated with gathering such information when the workload is to be executed.

The example process of FIG. 6 begins when the example workload container interface 225 accesses a workload provided by the device functionality 110. (Block 610). As noted in connection with FIG. 4, the example workload includes instructions, required capabilities and/or properties of a target workload orchestrator, a workload type, and a runtime selection strategy.

The example capability discoverer 230 identifies capabilities of connected remote devices. (Block 620). In examples disclosed herein, the capability discoverer 230 identifies those capabilities of the remote devices by transmitting a request for a list of capabilities and/or properties of a remote workload orchestrator of a given remote device via the example workload transmitter 245. That is, the example capability discoverer 230 implements an active runtime discovery approach, where capabilities and/or properties of remote devices are discovered on demand (e.g., in response to an incoming workload for execution). In examples disclosed herein, the capability discoverer 230 utilizes a device discovery protocol to discover the capabilities and/or properties of remote devices. However, any other approach and/or protocol(s) for remote capability discovery such as, for example, multicast domain name services (MDNS), Bonjour, etc. may additionally or alternatively be used.

While the illustrated example of FIG. 6 shows an active runtime discovery approach, in some examples, the example capability discoverer 230 implements a passive runtime discovery approach (and/or a combination of the passive runtime discovery approach and the active runtime discovery approach). For example, the example capability discoverer 230 may listen for connections to be established between the computing device on which the workload orchestrator 220 operates and a remote device (e.g., as a result of the user, connecting their smart glasses to their smart watch). In some examples, the capability discoverer 230 listens for such connections to be established, and requests capabilities and/or properties of those connected remote devices in response to such connection establishment.

The example capability discoverer 230 determines whether the capabilities of the remote device match those of the accessed workload. (Block 630). If the capability discoverer 325 determines that the capabilities of the remote device match those of the accessed workload (e.g., block 630 returns a result of YES), the example workload transmitter 245 transmits the workload to the remote device(s). (Block 640). In particular, the instructions are transmitted to the target workload orchestrator (e.g., a remote workload orchestrator) to enable execution of the same by the target workload orchestrator. The example capability discoverer 230 records an identification of the target device in connection with the workload in the capability data store 235. (Block 650). Such recordation enables the workload orchestrator to later identify which target workload orchestrator(s) have received the workload and/or meet the required capabilities and/or properties for execution of that workload. In some examples, the target workload orchestrator provides a workload identifier to the capability discoverer 230. The capability discoverer 230 stores the workload identifier in the capability data store 235 so that the workload at the target workload orchestrator can be referenced at a later time.

Returning to block 630, if the capability discoverer 230 determines that the capabilities of the remote device do not match those of the accessed workload (e.g., block 630 returns a result of NO), the example process 600 of FIG. 6 terminates. In some examples, the device functionality 110 may be informed that no nearby devices met the required capabilities and/or properties for execution of the provided workload.

Figure 7:
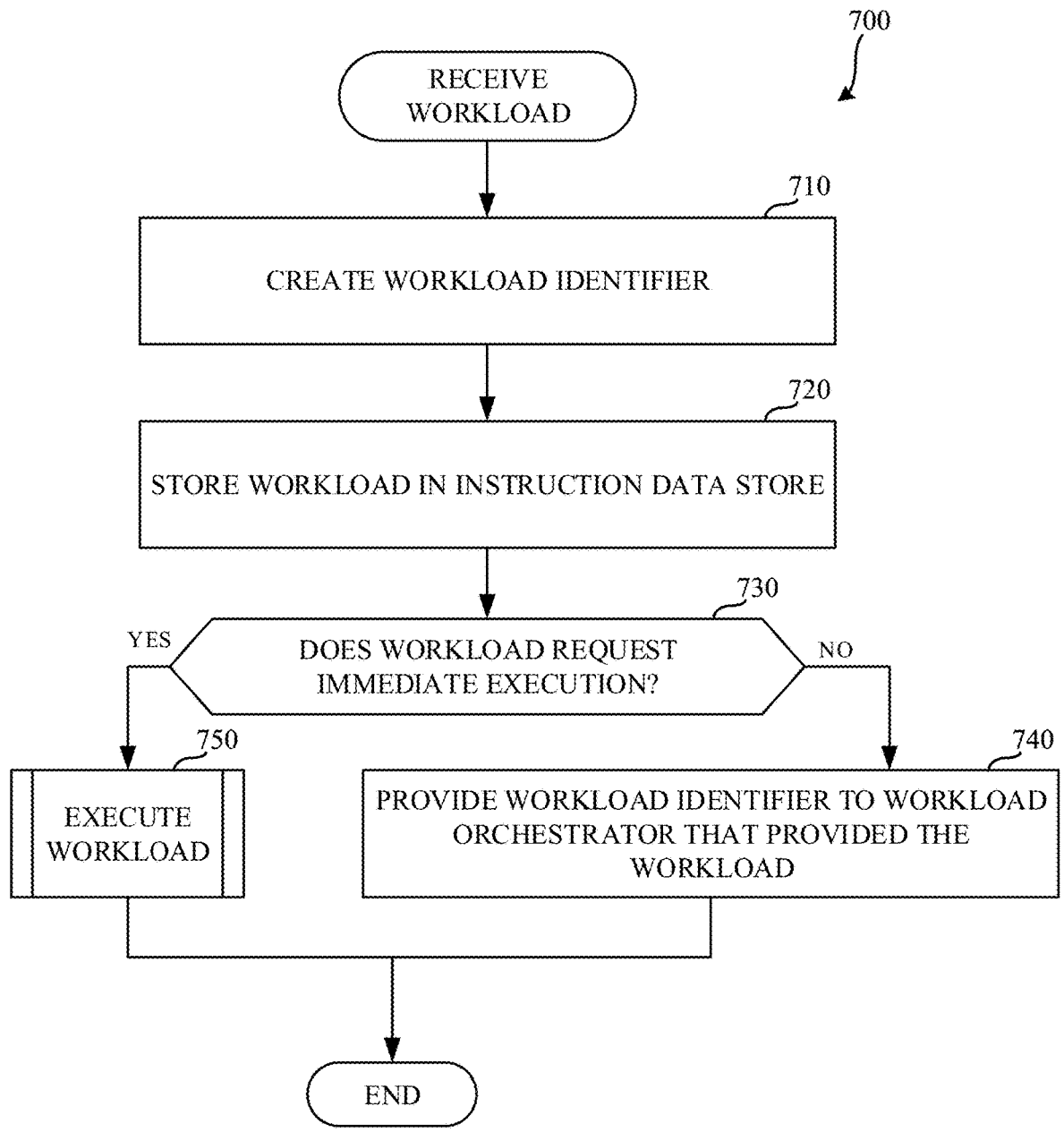
FIG. 7 is a flowchart representative of example machine readable instructions which may be executed to implement the example workload orchestrator of FIG. 1 to store a workload for execution at a remote device.

FIG. 7 is a flowchart representative of example machine readable instructions 700 which may be executed to implement the example workload orchestrator 220 of FIG. 2 at a remote device to store a workload for execution at the remote device. The example process 700 of the illustrated example of FIG. 7 begins when the example workload receiver 250 receives a workload from the workload transmitter 245 of another separate workload orchestrator. The example workload receiver 250 creates a workload identifier that identifies the received workload. (Block 710). The example workload receiver 250 stores the received workload in the instruction data store 255. (Block 720).

The example workload receiver 250 inspects the received workload to determine if the workload requests immediate execution. (Block 730). For example, the workload type may indicate that the workload is to begin execution immediately upon receipt of the workload at the target workload orchestrator if the workload type is set to either a batch style workload type or a message-oriented workload type. If the example workload receiver 250 determines that the workload is to immediately be executed, the workload executor 260 executes the instructions included with the workload stored in the instruction data store 255. An example approach for executing a workload is described below in connection with FIG. 10.

Returning to block 730, if the example workload receiver 250 determines that the workload does not request immediate execution, (e.g., block 730 returns a result of NO) the example workload receiver 250 returns a workload identifier to the workload orchestrator that provided the workload. (Block 740). The workload identifier allows the workload orchestrator that provided the workload to, at a later time, request execution of a workload that has been previously transmitted to the target workload orchestrator. The example process 700 of FIG. 7 then terminates.

Figure 8:
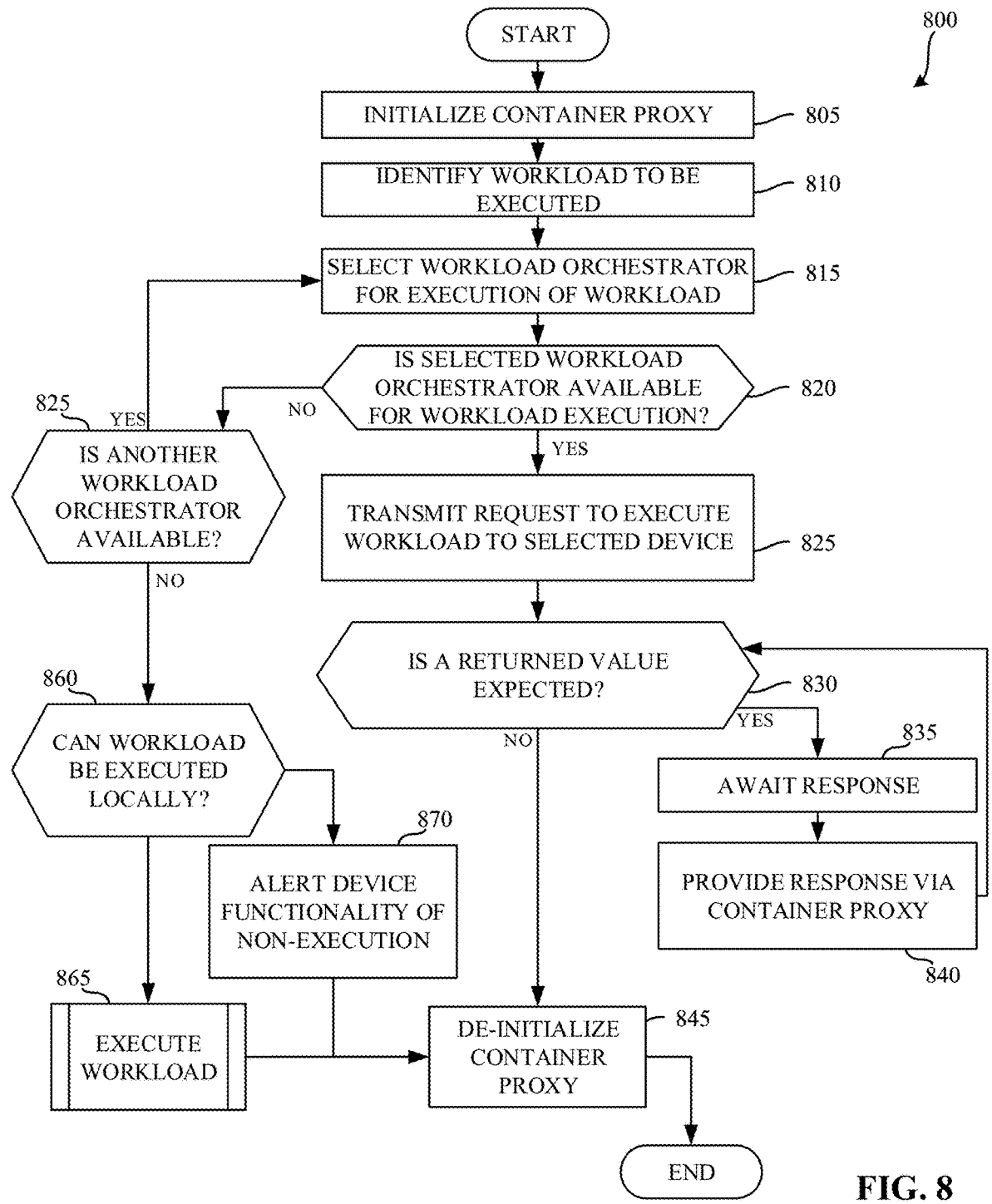
FIG. 8 is a flowchart representative of example machine readable instructions which may be executed to implement the example workload orchestrator of FIG. 1 to request execution of a remote workload.

FIG. 8 is a flowchart representative of example machine readable instructions 800 which may be executed to implement the example workload orchestrator 220 of FIG. 2 to request execution of a remote workload. Execution of the example instructions 800 is described from the perspective of the example workload orchestrator 220 implemented as the example workload orchestrator 120 of the example device 105 of FIG. 1 (e.g., a source workload orchestrator). The example process 800 of the illustrated example of FIG. 8 begins when the example device functionality 110 initializes the workload container interface 225. (Block 805). The example runtime selector 240 identifies the workload to be executed. (Block 810). The example runtime selector 240 identifies the workload to be executed based on, for example, a workload name provided by the device functionality 110. In some examples, the workload orchestrator returns a workload proxy (e.g., a reference) to the device functionality. In such an example, workload names are not necessary.

The example runtime selector 240 selects a target workload orchestrator (e.g., a remote workload orchestrator) for execution of the workload based on the required capabilities and/or properties of the workload (e.g., the required capabilities and/or properties 430 of FIG. 4), and the selected runtime selection strategy of the workload (e.g., the runtime selection strategy 450 of FIG. 4). In examples disclosed herein, the example runtime selector 240 reviews capabilities of other devices that had been previously discovered by the example capability discoverer 230 and stored in the example capability data store 235. However, in some examples, the runtime selector 240 may cause the example capability discoverer 230 to actively request capabilities of connected devices (e.g., nearby devices).

The example runtime selector 240 determines whether the selected runtime (e.g., the selected workload orchestrator) on which the workload is to be executed is available for workload execution. (Block 820). In some examples, the example runtime selector 240 selects from any known devices that have been previously connected to the workload orchestrator 220. However, in some examples, the example runtime selector 240 may select from only those devices that are presently connected. In some examples, the workload orchestrator 220 of the local device 105 may be considered in the selection scheme (e.g., the workload may be executed locally). In examples disclosed herein, the example runtime selector 240 transmits a request message to the selected target workload orchestrator via the workload transmitter 245 to confirm the availability of the target workload orchestrator to execute the workload. However, any other approach may be used to determine whether a workload orchestrator is available to execute the workload. In some examples, such confirmation is omitted.

If the selected workload orchestrator is not available for workload execution (e.g., block 820 returns a result of NO), the example runtime selector 240 determines whether any other runtimes are available for selection. (Block 825). The example process of blocks 815, 820, and 825 is repeated until the example runtime selector identifies an available workload orchestrator for execution of the workload (e.g., block 820 returns a result of YES), or until the example runtime selector identifies that no other workload orchestrators are available (e.g., block 825 returns a result of NO).

If the selected runtime is available for workload execution (e.g., block 820 returns a result of YES), the example workload transmitter 245 transmits a request to execute the workload to the selected workload orchestrator. In examples disclosed herein, the request to execute the workload includes the workload identifier provided in connection with the example processes of FIGS. 6 and/or 7.

The example workload transmitter 245 determines whether a return value is expected as a result of execution of the workload. (Block 830). In some examples, the workload may simply cause an operation to be performed on the target workload orchestrator that does not require a return value (e.g., displaying alert to a user). However, in some examples, the workload results in a return value (e.g., a user input in response to a prompt, a calculated value, etc.) that is to be returned to the workload transmitter 245. If the return value is expected (e.g., block 830 returns a result of YES), the example workload transmitter 245 awaits a response from the workload orchestrator on which the workload is executed. (Block 835). The example workload transmitter 245 then relays the response to the device functionality 110 via the container proxy hosted by the workload container interface 225. The example process of blocks 830, 835, 840 is then repeated until no further return values are expected.

If the example workload transmitter 245 does not expect a return value to be received (e.g., block 730 returns a result of NO), the example runtime selector 240 de-initializes the container proxy hosted by the workload container interface 225. (Block 845). The example process 800 of the illustrated example of FIG. 8 then terminates. The example process of FIG. 8 may then be repeated upon subsequent requests by the device functionality 110 to request execution of a workload.

Returning to block 825, in some examples, no other workload orchestrator matching the required parameters of the workload may be available (e.g., block 825 returns a result of NO). In some such examples, the example runtime selector 240 determines whether the local workload executor 260 should execute the workload. (Block 860). Such a determination may be based on whether, for example, the capabilities and/or properties required by the workload match the capabilities and/or properties of the device 105 on which the workload orchestrator 220 is implemented. If the example runtime selector 240 determines that the workload executor 260 should execute the workload (e.g., block 860 returns a result of YES), the example workload executor 260 executes the workload. (Block 865). An example approach for executing the workload is described below in connection with FIG. 10. Upon completion of execution of the workload, the example runtime selector 240 de-initializes the container proxy hosted by the example workload container interface 225. (Block 845). The example process of FIG. 8 then terminates.

Returning to block 860, in some examples, the example runtime selector 240 may determine that the local workload executor should not execute the workload (e.g., block 860 returns a result of NO). In some such examples, the example runtime selector 240 informs the device functionality 110 of the unavailability of a workload orchestrator able to execute the provided workload. (Block 870). The example runtime selector 240 de-initializes the container proxy hosted by the example workload container interface 225. (Block 845). The example process of FIG. 8 then terminates.

Figure 9:
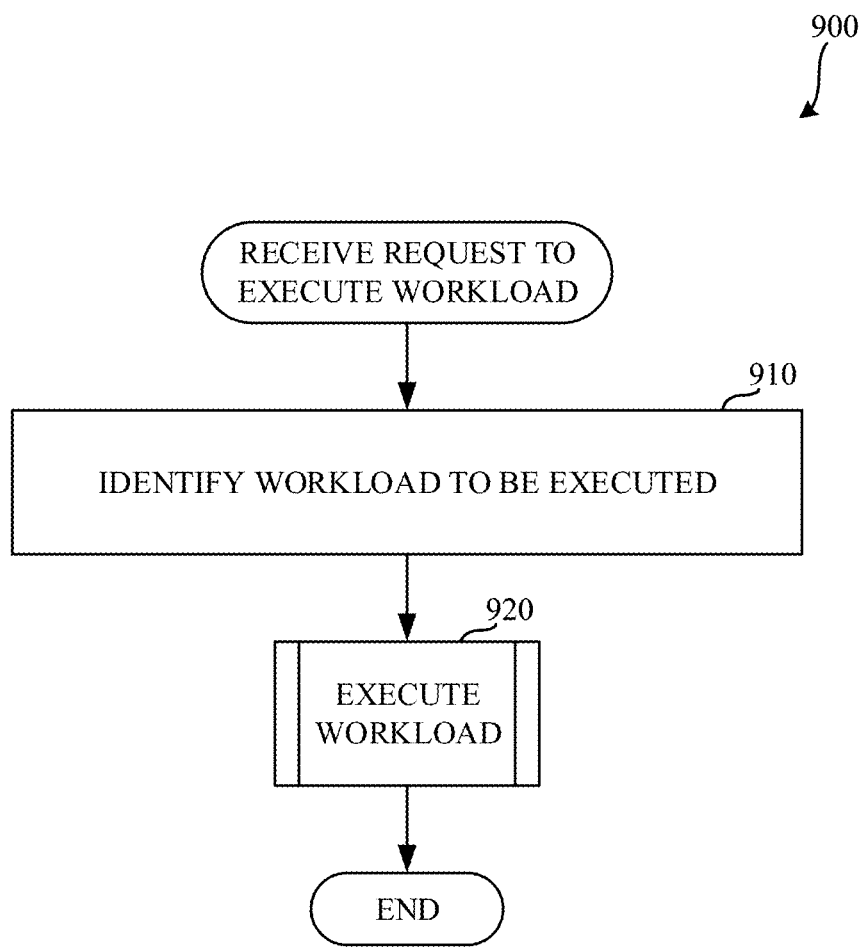
FIG. 9 is a flowchart representative of example machine readable instructions which may be executed to implement the example workload orchestrator of FIG. 1 to execute a remote workload.

FIG. 9 is a flowchart representative of example machine readable instructions 900 which may be executed to implement the example workload orchestrator 220 of FIG. 2 to execute a remote workload. The example process 900 of the illustrated example of FIG. 9 begins when the example workload receiver 250 receives a request to execute a workload. In examples disclosed herein, the example request to execute the workload includes a workload identifier that had been previously transmitted to a separate workload orchestrator (e.g., upon a request to pre-register a workload at a workload orchestrator). In some examples, the request to execute the workload additionally includes workload parameters (e.g., data) that is to be used during execution of the workload. The example workload receiver 250 identifies the workload to be executed based on the workload identifier and the previously received workload stored in the example instruction data store 255. (Block 910) The example workload executor 260 then executes the workload (using the provided workload parameters, if present). (Block 920). An example approach to execution of workload is described below in connection with FIG. 10.

Figure 10:
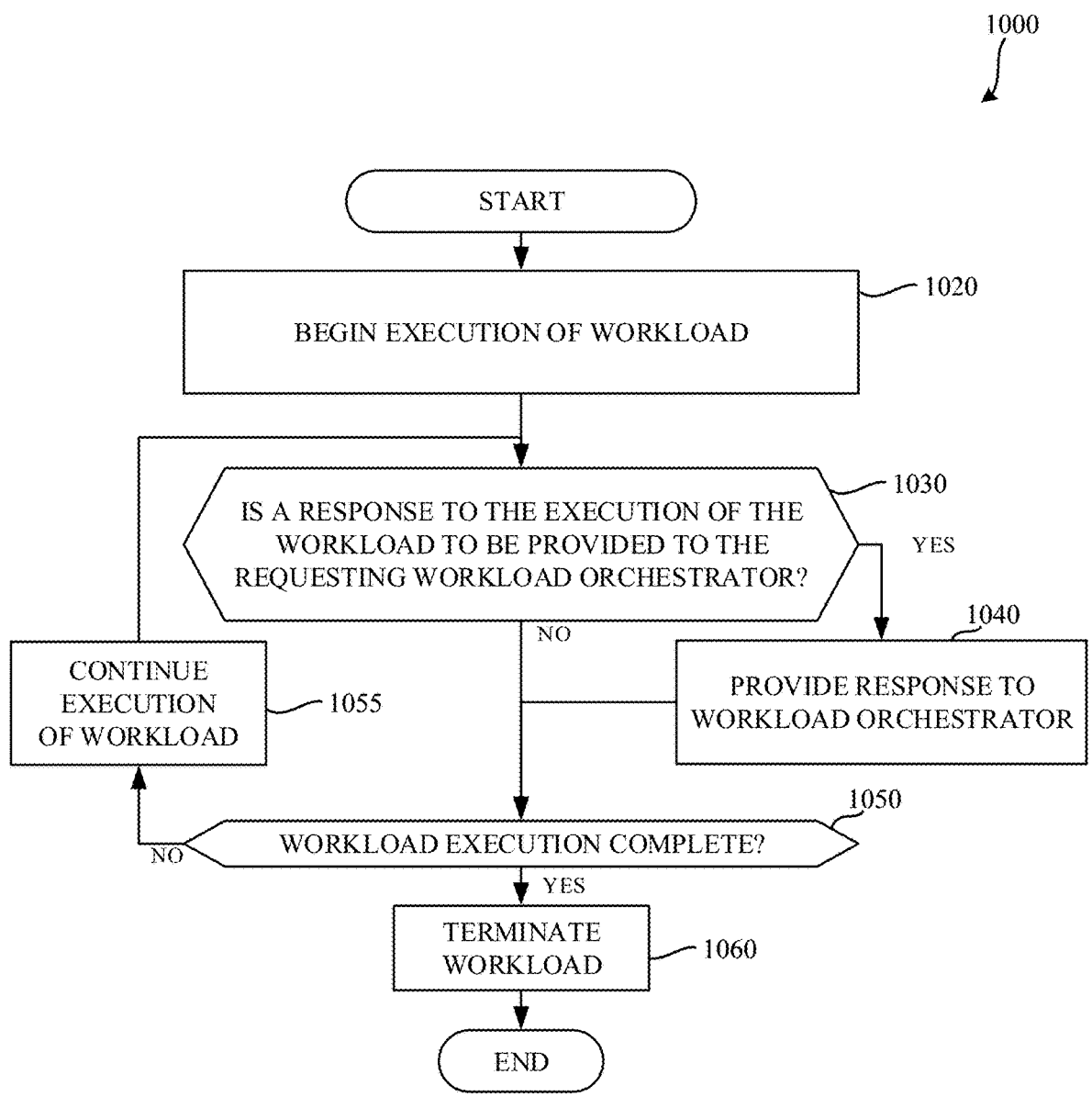
FIG. 10 is a flowchart representative of example machine readable instructions which may be executed to implement the example workload orchestrator of FIG. 1 to execute a workload.

FIG. 10 is a flowchart representative of example machine readable instructions 1000 which may be executed to implement the example workload orchestrator 220 of FIG. 2 to execute a workload. The example process 1000 of the illustrated example of FIG. 10 begins when the example workload executor 260 receives an instruction to execute a workload. In some examples, the instruction to execute a workload includes workload parameters (e.g., input arguments) that are to be used when executing the workload. The example workload executor 260 begins execution of the workload (using the provided workload parameters, if present). (Block 1020). In examples disclosed herein, the example workload executor 260 executes the workload by retrieving the instructions associated with the workload from the instruction data store 255, and executing those instructions. In some examples, the workload executor 260 operates in connection with other execution subsystems of the example computing device on which the workload orchestrator 220 is implemented. For example, the example workload executor 260 may provide the instructions to an interpreter, a compiler, an operating system, etc., for execution of the same.

The example workload executor 260 then determines whether a response to the execution of the workload is to be provided to the requesting workload orchestrator. (Block 1030). In some examples, (e.g., when a message-oriented style workload is used), response information is provided to the originating workload orchestrator by the workload executor 260 via the workload receiver 250. (Block 1040). Such response information may include, for example, status information, information concerning completion of the execution of instructions, etc.

Upon the response being provided to the originating workload orchestrator (e.g., execution of block 1040), or upon the determination that no response is to be provided to the requesting workload orchestrator (e.g., block 1030 returning a result of NO), the example workload executor 260 determines whether execution of the workload has completed. If workload execution is not completed (e.g., block 1050 returns a result of NO), control proceeds to block 1050 where the execution of the workload is continued. The execution of blocks 1030, 1040, 1050, 1055 is continued until the example workload executor 260 determines that the execution of the workload is complete (e.g., block 1050 returns a result of YES). The example workload is then terminated by the workload executor 260 (Block 1060). In some examples, the termination of the workload includes deletion of the workload from the instruction data store 255. Deleting the workload from the instruction data store 255 frees resources of the computing device on which the workload orchestrator 220 is implemented (e.g., the smart phone device 105 of FIG. 1) for future workloads to be received and/or executed. In some examples, termination of the workload includes transmission of the message to the originating workload orchestrator via the workload receiver 250 that the workload has completed its execution and/or has been terminated.

Figure 11:
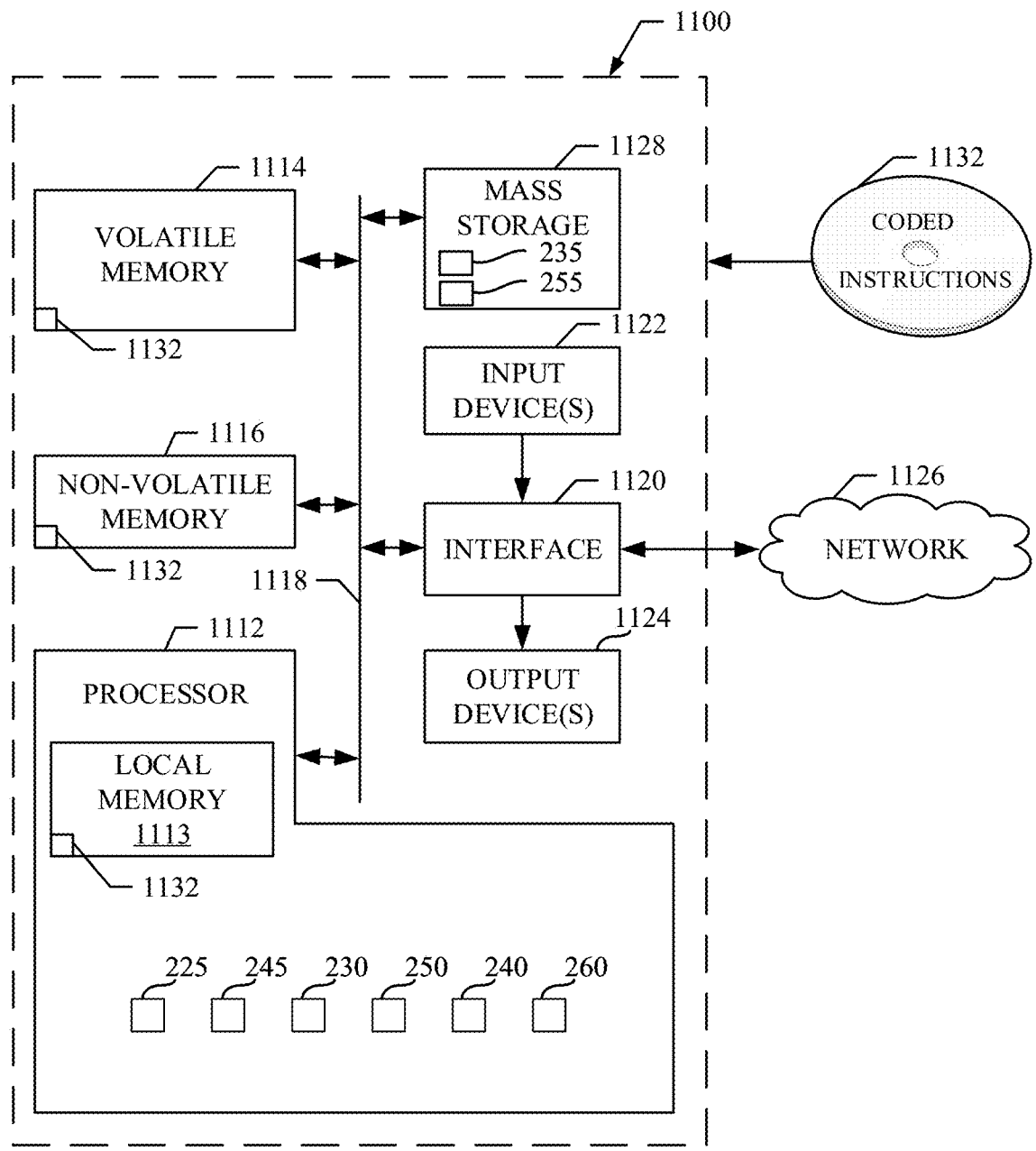
FIG. 11 is a block diagram of an example processing platform structured to execute the instructions of FIGS. 6, 7, 8, 9, and/or 10 to implement the example workload orchestrator of FIG. 1.

FIG. 11 is a block diagram of an example processor platform 1100 structured to execute the instructions of FIGS. 6, 7, 8, 9, and/or 10 to implement the workload orchestrator 220 of FIG. 2. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example workload container interface 225, the example capability discoverer 230, the example runtime selector 240, the example workload transmitter, the example workload receiver 250, and/or the example workload executor 260.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit

1120 may be implemented by any type of interface standard, such as an Ethernet interface, a universal serial bus (USB), a Bluetooth® interface, a near field communication (NFC) interface, and/or a PCI express interface.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives.

The machine executable instructions 1132 of FIGS. 6, 7, 8, 9, and/or 10 may be stored in the mass storage device 1128, in the volatile memory 1114, in the non-volatile memory 1116, and/or on a removable non-transitory computer readable storage medium such as a CD or DVD.

From the foregoing, it will be appreciated that example methods, apparatus and articles of manufacture have been disclosed that enable workloads to be executed by remote devices, including wearable devices. Such approaches enable a developer to retain full control of where a workload will be executed. Such approaches enable certain workloads to be specified as requiring certain device parameters and/or characteristics such as, for example, a specific type, a particular form factor, a particular brand, etc. Such approaches enable customized experiences beyond a single device. For example, some functionality of a smart glasses application might only be available to users who are also wearing a smart watch of the same brand.

Moreover, example approaches disclosed herein enable an application running on a resource-limited wearable device to gain access to resources of another remote device (e.g., inputs, outputs, computing resources, etc.). For example, a wearable device may be able to access resources related to internet connectivity, location information, orientation information, buttons, keyboard, screens, speakers, etc.

Since the workload is executed in the remote device, example approaches disclosed herein enable CPU intensive workloads to be offloaded from devices with lesser computing capabilities to devices with greater computing capabilities. For example, a workload may be offloaded from a wearable device (e.g., a smartwatch having limited computing resources) to a more powerful and/or capable device, like a smart phone, supporting much more complex processing than possible in the wearable device.

The following further examples are disclosed herein:

Example 1 includes an apparatus to distribute a workload for execution, the apparatus comprising a workload container interface to access a workload for execution at a remote device, the workload including workload instructions and a specified capability to be met by the remote device, the remote device including at least one of a type of input or a type of output that is not available to the apparatus, a runtime selector to select the remote device for execution of the workload based on the specified capability being present in a list of capabilities discovered for the remote device, and a workload transmitter to transmit, in response to the selection of the remote device for execution of the workload, the workload to the remote device for execution.

Example 2 includes the apparatus of example 1, wherein the remote device is a wearable device.

Example 3 includes the apparatus of example 2, wherein the wearable device is a smartwatch.

Example 4 includes the apparatus of example 3, wherein the at least one of a type of input or a type of output is a vibrational engine.

Example 5 includes the apparatus of any one of examples 1-4, further including a capability discoverer is to communicate with the remote device to discover the list of capabilities of the remote device.

Example 6 includes the apparatus of example 5, wherein the capability discoverer is further to store an identifier of the workload returned by the remote device, and the workload transmitter is further to transmit a request to execute the workload based on the identifier.

Example 7 includes the apparatus of example 1, wherein, in response to execution of the workload at the remote device, the workload transmitter is further to access a result of the execution of the workload, and provide the result of the execution of the workload to the device functionality of the apparatus.

Example 8 includes the apparatus of example 1, wherein, in response to determining that no remote device is available for execution of the workload, the runtime selector is further to determine whether the workload can be executed by the apparatus, the apparatus further including a workload executor to execute the workload, in response to the determining that the workload can be executed by the apparatus, and to provide a result of the execution of the workload to device functionality of the apparatus.

Example 9 includes the apparatus of example 1, wherein the runtime selector is further to, in response to determining that no remote device is available for execution of the workload, determine whether the workload can be executed by the apparatus and, in response to determining that the workload cannot be executed by the apparatus, alert device functionality of the apparatus that the workload cannot be executed.

Example 10 includes at least one non-transitory machine readable medium comprising instructions that, when executed, cause a processor to at least access a workload provided by a device functionality for execution at a target device, the workload including workload instructions and a first capability required of the target device to execute the workload, discover a list of capabilities of the target device, select the target device for execution of the workload based on the first capability being present in the list of capabilities, and in response to the selection of the target device for execution of the workload, transmit the workload to the target device for execution.

Example 11 includes the at least one non-transitory machine readable medium of example 10, wherein the instructions, when executed, further cause the processor to at least store an identifier of the workload returned by the target device, and transmit a request to execute the workload based on the identifier.

Example 12 includes the at least one non-transitory machine readable medium of example 10, wherein the instructions, when executed, further cause the processor to access a result of the execution of the workload, and provide the result of the execution of the workload to device functionality of a local device associated with the processor.

Example 13 includes the at least one non-transitory machine readable medium of example 10, wherein the instructions, when executed, further cause the processor to, in response to determining that no target device is available for execution of the workload determine whether the workload can be executed by a local device associated with the processor, in response to the determining that the workload can be executed by the local device, cause the local device to execute the workload, and provide a result of execution of the workload to device functionality of the local device.

Example 14 includes the at least one non-transitory machine readable medium of any one of examples 10-13, wherein the instructions, when executed, further cause the processor to, in response to determining that no target device is available for execution of the workload, inform device functionality that the workload cannot be executed.

Example 15 includes a method to distribute a workload for execution, the method comprising accessing, by executing an instruction with a processor, a workload for execution at a remote device, the workload including workload instructions and a specified capability to be met by the remote device, the remote device including at least one of a type of input or a type of output that is not available to the processor, discovering a list of capabilities of the remote device, selecting, by executing an instruction with the processor, the remote device for execution of the workload based on the specified capability being present in the list of capabilities, and in response to the selection of the remote device for execution of the workload, transmitting the workload to the remote device for execution.

Example 16 includes the method of example 15, further including storing an identifier of the workload returned by the remote device, and transmitting a request to execute the workload based on the identifier.

Example 17 includes the method of example 15, further including, in response to execution of the workload at the remote device accessing a result of the execution of the workload, and providing the result of the execution of the workload to device functionality implemented by the processor.

Example 18 includes the method of example 15, further including, in response to determining that no remote device is available for execution of the workload determining whether the workload can be executed by the processor, in response to the determining that the workload can be executed by the processor, executing the workload, and providing a result of the execution of the workload to device functionality.

Example 19 includes the method of any one of examples 15-18, further including, in response to determining that no remote device is available for execution of the workload determining whether the workload can be executed by the processor, and in response to the determining that the workload cannot be executed by the processor, alerting device functionality implemented by the processor that the workload cannot be executed.

Example 20 includes an apparatus to distribute a workload for execution, the apparatus comprising means for accessing a workload provided by a device functionality for execution at a target device, the workload including workload instructions and a first capability required of the target device to execute the workload, means for selecting the remote device for execution of the workload based on the first capability being present in a list of capabilities discovered for the target device, and means for transmitting, in response to the selection of the target device for execution of the workload, the workload to the target device for execution.

Example 21 includes the apparatus of example 20, further including means for storing an identifier of the workload provided by the target device, and the means for transmitting is further to transmit a request to execute the workload based on the identifier.

Example 22 includes the apparatus of example 20, wherein the means for transmitting is further to, in response to execution of the workload at the remote device, access a result of the execution of the workload, and provide the result of the execution of the workload to the device functionality.

Example 23 includes the apparatus of example 20, wherein the means for selecting is further to, in response to determining that no remote device is available for execution of the workload, determine whether the workload can be executed by the apparatus, the apparatus further including means for executing the workload.

Example 24 includes the apparatus of any one of examples 20-23, wherein the means for selecting is further to, in response to determining that no remote device is available for execution of the workload, output an alert that the workload cannot be executed.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to distribute a workload for execution, the apparatus comprising:
 a workload container interface to access a workload for execution at a remote device, the workload including workload instructions and a specified capability to be met by the remote device, the remote device including at least one of a type of input or a type of output that is not available to the apparatus;
 a capability discoverer to communicate with the remote device to discover a list of capabilities of the remote device, the capability discoverer to store an identifier of the workload returned by the remote device;
 a runtime selector to select the remote device for execution of the workload based on the specified capability being present in the list of capabilities discovered for the remote device; and
 a workload transmitter to transmit, in response to the selection of the remote device for execution of the workload, the workload to the remote device for execution, the workload transmitter to transmit a request to execute the workload based on the identifier, at least one of the workload container interface, the capability discoverer, the runtime selector, or the workload transmitter is implemented by hardware.

2. The apparatus of claim 1, wherein the remote device is a wearable device.

3. The apparatus of claim 2, wherein the wearable device is a smartwatch.

4. The apparatus of claim 3, wherein the at least one of a type of input or a type of output is a vibrational engine.

5. The apparatus of claim 1, wherein, in response to execution of the workload at the remote device, the workload transmitter is further to access a result of the execution of the workload and provide the result of the execution of the workload to device functionality of the apparatus.

6. The apparatus of claim 1, wherein, in response to determining that no remote device is available for execution of the workload, the runtime selector is further to determine whether the workload can be executed by the apparatus, the apparatus further including:
    a workload executor to execute the workload, in response to the determining that the workload can be executed by the apparatus, and to provide a result of the execution of the workload to device functionality of the apparatus.

7. The apparatus of claim 1, wherein the runtime selector is further to, in response to determining that no remote device is available for execution of the workload;
    determine whether the workload can be executed by the apparatus; and
    in response to determining that the workload cannot be executed by the apparatus, alert device functionality of the apparatus that the workload cannot be executed.

8. At least one non-transitory machine readable medium comprising instructions that, when executed, cause a processor to at least:
    access a workload provided by a device functionality for execution at a target device, the workload including workload instructions and a first capability required of the target device to execute the workload;
    discover a list of capabilities of the target device;
    select the target device for execution of the workload based on the first capability being present in the list of capabilities; and
    in response to the selection of the target device for execution of the workload;
        transmit the workload to the target device for execution;
        store an identifier of the workload returned by the target device; and
        transmit a request to execute the workload based on the identifier.

9. The at least one non-transitory machine readable medium of claim 8, wherein the instructions, when executed, further cause the processor to:
    access a result of the execution of the workload; and
    provide the result of the execution of the workload to device functionality of a local device associated with the processor.

10. The at least one non-transitory machine readable medium of claim 8, wherein the instructions, when executed, further cause the processor to, in response to determining that no target device is available for execution of the workload:
    determine whether the workload can be executed by a local device associated with the processor;
    in response to the determining that the workload can be executed by the local device, cause the local device to execute the workload; and
    provide a result of execution of the workload to device functionality of the local device.

11. The at least one non-transitory machine readable medium of claim 8, wherein the instructions, when executed, further cause the processor to, in response to determining that no target device is available for execution of the workload:
    determine whether the workload can be executed by the processor; and
    in response to determining that the workload cannot be executed by the processor, alert device functionality implemented by the processor that the workload cannot be executed.

12. A method to distribute a workload for execution, the method comprising:
    accessing, by executing an instruction with a processor, a workload for execution at a remote device, the workload including workload instructions and a specified capability to be met by the remote device, the remote device including at least one of a type of input or a type of output that is not available to the processor;
    discovering a list of capabilities of the remote device;
    selecting, by executing an instruction with the processor, the remote device for execution of the workload based on the specified capability being present in the list of capabilities; and
    in response to the selection of the remote device for execution of the workload;
        transmitting the workload to the remote device for execution;
        storing an identifier of the workload returned by the remote device; and
        transmitting a request to execute the workload based on the identifier.

13. The method of claim 12, further including, in response to execution of the workload at the remote device:
    accessing a result of the execution of the workload; and
    providing the result of the execution of the workload to device functionality implemented by the processor.

14. The method of claim 12, further including, in response to determining that no remote device is available for execution of the workload:
    determining whether the workload can be executed by the processor;
    in response to the determining that the workload can be executed by the processor, executing the workload; and
    providing a result of the execution of the workload to device functionality implemented by the processor.

15. The method of claim 12, further including, in response to determining that no remote device is available for execution of the workload:
    determining whether the workload can be executed by the processor; and
    in response to the determining that the workload cannot be executed by the processor, alerting device functionality implemented by the processor that the workload cannot be executed.

* * * * *